(12) United States Patent
Saylor et al.

(10) Patent No.: US 12,371,000 B2
(45) Date of Patent: Jul. 29, 2025

(54) DAMPER CONTROL SYSTEMS AND METHODS BASED ON OIL DETECTED FROM FORWARD IMAGES

(71) Applicant: GM GLOBAL TECHNOLOGY OPERATIONS LLC, Detroit, MI (US)

(72) Inventors: Brian K. Saylor, South Lyon, MI (US); Christopher J. Mettrick, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 18/079,468

(22) Filed: Dec. 12, 2022

(65) Prior Publication Data

US 2024/0190412 A1    Jun. 13, 2024

(51) Int. Cl.
| | |
|---|---|
| *B60W 10/22* | (2006.01) |
| *B60W 40/06* | (2012.01) |
| *B60W 40/105* | (2012.01) |
| *B60W 50/00* | (2006.01) |
| *G06V 10/75* | (2022.01) |
| *G06V 20/56* | (2022.01) |

(52) U.S. Cl.
CPC ............ *B60W 10/22* (2013.01); *B60W 40/06* (2013.01); *B60W 40/105* (2013.01); *B60W 50/00* (2013.01); *G06V 10/751* (2022.01); *G06V 20/588* (2022.01); *B60W 2050/0083* (2013.01); *B60W 2420/403* (2013.01); *B60W 2552/53* (2020.02); *B60W 2710/226* (2013.01)

(58) Field of Classification Search
None
See application file for complete search history.

(56) References Cited

U.S. PATENT DOCUMENTS

| | | | |
|---|---|---|---|
| 10,832,426 B2 * | 11/2020 | Aikin | G06V 20/58 |
| 2010/0121529 A1 * | 5/2010 | Savaresi | B60G 17/018 |
| | | | 701/37 |
| 2014/0347448 A1 * | 11/2014 | Hegemann | B60W 40/064 |
| | | | 348/46 |
| 2015/0367702 A1 * | 12/2015 | Kubota | B60G 17/0165 |
| | | | 701/37 |
| 2017/0293814 A1 * | 10/2017 | Elie | H04N 23/56 |
| 2020/0346507 A1 * | 11/2020 | Kim | B60G 17/017 |
| 2024/0125899 A1 * | 4/2024 | Khadem | G01S 7/4802 |

FOREIGN PATENT DOCUMENTS

| | | |
|---|---|---|
| DE | 3738221 A1 | 6/1989 |
| DE | 102013002333 A1 | 8/2014 |

OTHER PUBLICATIONS

Office Action dated Apr. 3, 2024 from German Patent Office for German Patent No. 102023122802.1; 5pgs.

* cited by examiner

*Primary Examiner* — Vivek D Koppikar
*Assistant Examiner* — David Ruben Pedersen

(57) ABSTRACT

A damper control system includes: a lane module configured to identify boundaries of a present lane of a vehicle in an image of a road in front of the vehicle captured using a forward facing camera; an oil module configured to, from the image, determine whether an area of oil is present on the road between the boundaries of the present lane of the vehicle; and a damping module configured to, when the area of oil is present on the road between the boundaries of the present lane of the vehicle, selectively adjust damping coefficients of adjustable dampers of the vehicle before the vehicle reaches the area of oil on the road.

18 Claims, 7 Drawing Sheets

DAMPER CONTROL SYSTEMS AND METHODS BASED ON OIL DETECTED FROM FORWARD IMAGES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle sensors and cameras and more particularly to systems and methods for controlling damping of dampers of vehicles based on detection of oil on roadways.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward-facing cameras, rear-facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a damper control system includes: a lane module configured to identify boundaries of a present lane of a vehicle in an image of a road in front of the vehicle captured using a forward facing camera; an oil module configured to, from the image, determine whether an area of oil is present on the road between the boundaries of the present lane of the vehicle; and a damping module configured to, when the area of oil is present on the road between the boundaries of the present lane of the vehicle, selectively adjust damping coefficients of adjustable dampers of the vehicle before the vehicle reaches the area of oil on the road.

In further features: the oil module is further configured to, from the image, when the area of oil is present on the road between the boundaries of the present lane of the vehicle, determine a transition of the area of oil on the road; and the damping module is configured to adjust the damping coefficients of the adjustable dampers based on the transition.

In further features, the damping module is configured to, when the transition of the area of oil on the road is from lighter to darker: for a first period, decrease the damping coefficients of the adjustable dampers; and for a second period that is after the first period, increase the damping coefficients of the adjustable dampers.

In further features, the damping module is configured to, when the transition of the area of oil on the road is from darker to lighter, increase the damping coefficients of the adjustable dampers.

In further features, the oil module is configured to determine the transition of the area of oil on the road based on intensity values of pixels of the area of oil in the image.

In further features, the oil module is configured to set the transition to darker to lighter when the intensity values of the pixels increase vertically upwardly in the image.

In further features, the oil module is configured to set the transition to lighter to darker when the intensity values of the pixels decrease vertically upwardly in the image.

In further features, the oil module is configured to determine whether the area of oil is present on the road between the boundaries of the present lane of the vehicle based on intensity values of pixels of the image between the boundaries of the present lane.

In further features, the oil module is configured to determine that the area of oil is present on the road between the boundaries of the present lane of the vehicle when a predetermined number of neighboring pixels between the boundaries of the present lane have intensity values, respectively, that are less than a predetermined intensity value, where the predetermined number is greater than one.

In further features, the oil module is configured to determine that the area of oil is present on the road between the boundaries of the present lane of the vehicle when a predetermined number of neighboring pixels arranged in a predetermined shape between the boundaries of the present lane have intensity values, respectively, that are less than a predetermined intensity value, where the predetermined number is greater than one and the shape is a rectangle.

In further features, the damping module is configured to adjust magnetic field output to the adjustable dampers of the vehicle before the vehicle reaches the area of oil on the road when the area of oil is present on the road between the boundaries of the present lane of the vehicle.

In further features, the adjustable dampers include magnetorheological dampers.

In further features, the adjustable dampers include continuous damping control (CDC) dampers.

In further features, a learning module is configured to selectively change the adjustments made by the damping module based on a vertical acceleration of the vehicle.

In further features, the learning module is configured to selectively change the adjustments made by the damping module based on the vertical acceleration of the vehicle at or after a vertical change in the road located before the area of oil on the road.

In a feature, a damper control method includes: identifying boundaries of a present lane of a vehicle in an image of a road in front of the vehicle captured using a forward facing camera; from the image, determining whether an area of oil is present on the road between the boundaries of the present lane of the vehicle; and when the area of oil is present on the road between the boundaries of the present lane of the vehicle, selectively adjusting damping coefficients of adjustable dampers of the vehicle before the vehicle reaches the area of oil on the road.

In further features, the damper control method further includes: from the image, when the area of oil is present on the road between the boundaries of the present lane of the vehicle, determining a transition of the area of oil on the road; and adjusting the damping coefficients of the adjustable dampers based on the transition.

In further features, the damper control method further includes, when the transition of the area of oil on the road is from lighter to darker: for a first period, decreasing the damping coefficients of the adjustable dampers; and for a second period that is after the first period, increasing the damping coefficients of the adjustable dampers.

In further features, the damper control method further includes, when the transition of the area of oil on the road is from darker to lighter, increasing the damping coefficients of the adjustable dampers.

In further features, the damper control method further includes determining the transition of the area of oil on the road based on intensity values of pixels of the area of oil in the image.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a camera configured to capture images within a predetermined field of view (FOV) around an exterior of the vehicle. A perception module may perceive objects around the vehicle and determine locations of the objects. For example, a camera may be used to capture images including a road in front of the vehicle. Lane lines and objects on the road can be identified using images from the camera.

The present application involves identifying areas of vehicle oil on the road between boundaries of a present lane of the vehicle using one or more images from the camera. Areas of oil are left on the road by vehicles when vehicles traverse vertical rises (swells) and vertical falls (decreases) in the road surface. A damping control module selectively adjusts damping coefficients of adjustable dampers of the vehicle for vertical rises and vertical falls associated with detected areas of oil on the road. This provides better vehicle ride when and after the vehicle traverses vertical rises and falls.

Figure 1:
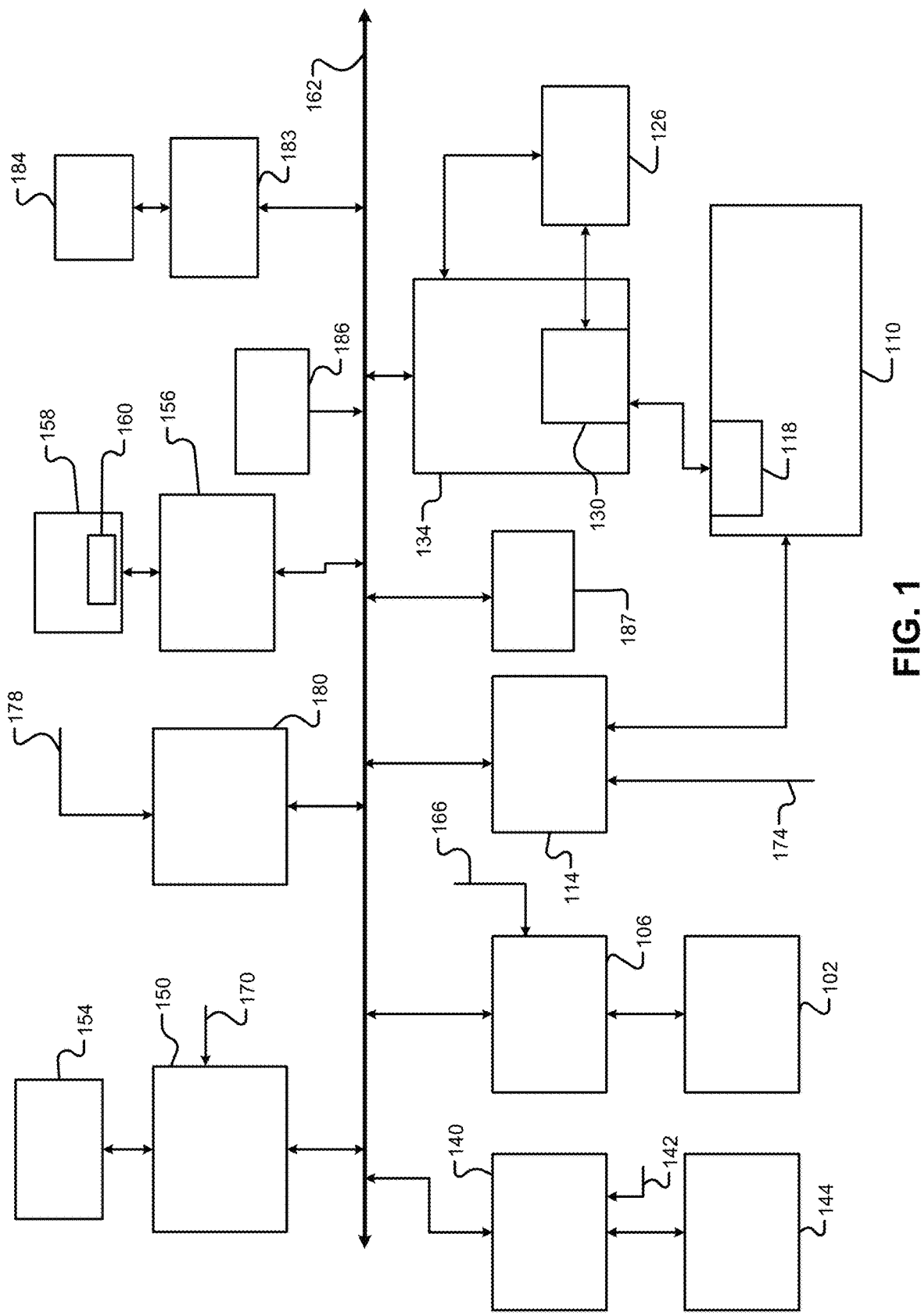
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. A damper control module 156 controls damping of dampers 158 of the wheels, respectively, of the vehicle. The dampers 158 damp vertical motion of the wheels. The damper control module 156 may control, for example, damping coefficients of the dampers 158, respectively. For example, the dampers 158 may include magnetorheological dampers, continuous damping control dampers, or another suitable type of adjustable damper. The dampers 158 include actuators 160 that adjust damping of the dampers 158, respectively. In the example of magnetorheological dampers, the actuators 160 may adjust magnetic fields applied to magnetorheological fluid within the dampers 158, respectively, to adjust damping.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, based on input from the external sensors and cameras 186, an oil detection module 404 (FIG. 4), such as of the damper control module 156, may detect areas of (engine) oil at or near centers of lanes of roads in front of the vehicle based on input from a forward facing camera. While oil is discussed, the present application is also applicable to other fluids of vehicles, such as transmission fluid, brake fluid, engine coolant, etc.

The vehicle may include one or more additional control modules that are not shown, such as a chassis control module, a battery pack control module, etc. The vehicle may omit one or more of the control modules shown and discussed.

Figure 2:
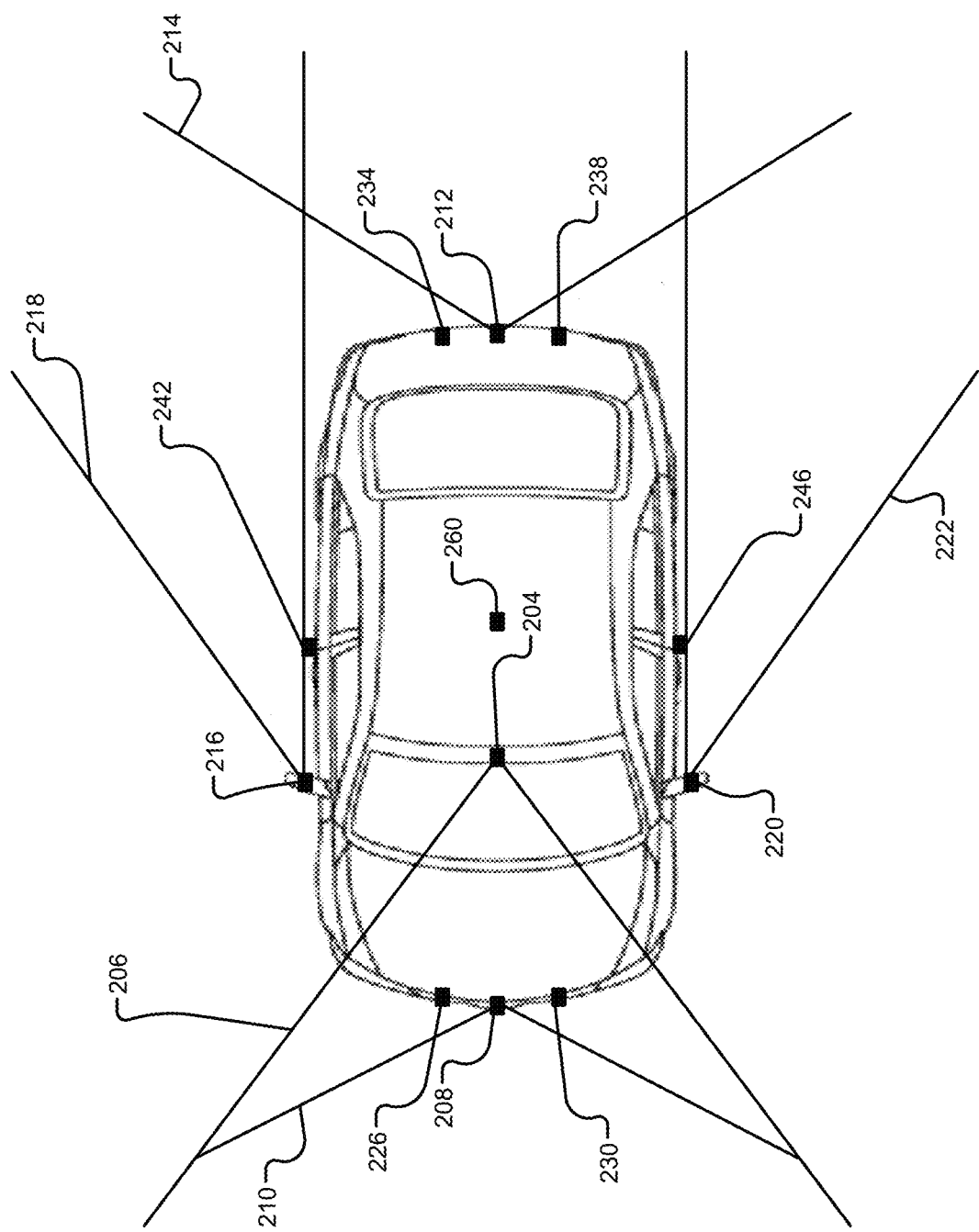
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to) the vehicle. Examples of the external sensors and cameras 186 will now be discussed. For example, a forward-facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward-facing camera 204 may be located more rearward, however, such as with a rear-view mirror at a windshield of the vehicle. The forward-facing camera 204 may not be able to capture images and video of items within all of or at least a portion of the predetermined FOV of the front camera 208 and may capture images and video more than the predetermined distance of the front of the vehicle. In various implementations, only one of the forward-facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear-view mirror. In various implementations, the right side rear-view mirror may be omitted, and the right camera 216 may be located near where the right side rear-view mirror would normally be located.

A left camera 220 captures images and video within a predetermined FOV 222 to the left of the vehicle. The left camera 220 may capture images and video within a predetermined distance to the left of the vehicle and may be located, for example, under a left side rear-view mirror. In various implementations, the left side rear-view mirror may be omitted, and the left camera 220 may be located near where the left side rear-view mirror would normally be located. While the example FOVs are shown for illustrative purposes, the present application is also applicable to other FOVs. In various implementations, FOVs may overlap, for example, for more accurate and/or inclusive stitching.

The external sensors and cameras 186 may additionally or alternatively include various other types of sensors, such as light detection and ranging (LIDAR) sensors, ultrasonic sensors, radar sensors, and/or one or more other types of sensors. For example, the vehicle may include one or more forward-facing ultrasonic sensors, such as forward-facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The vehicle may also include one or more light detection and ranging (LIDAR) sensors, such as LIDAR sensor 260. The locations of the cameras and sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more other types of sensors. In various implementations, only a forward facing camera (e.g., 204) may be included or used for the oil detection and control features described herein.

Figure 3:
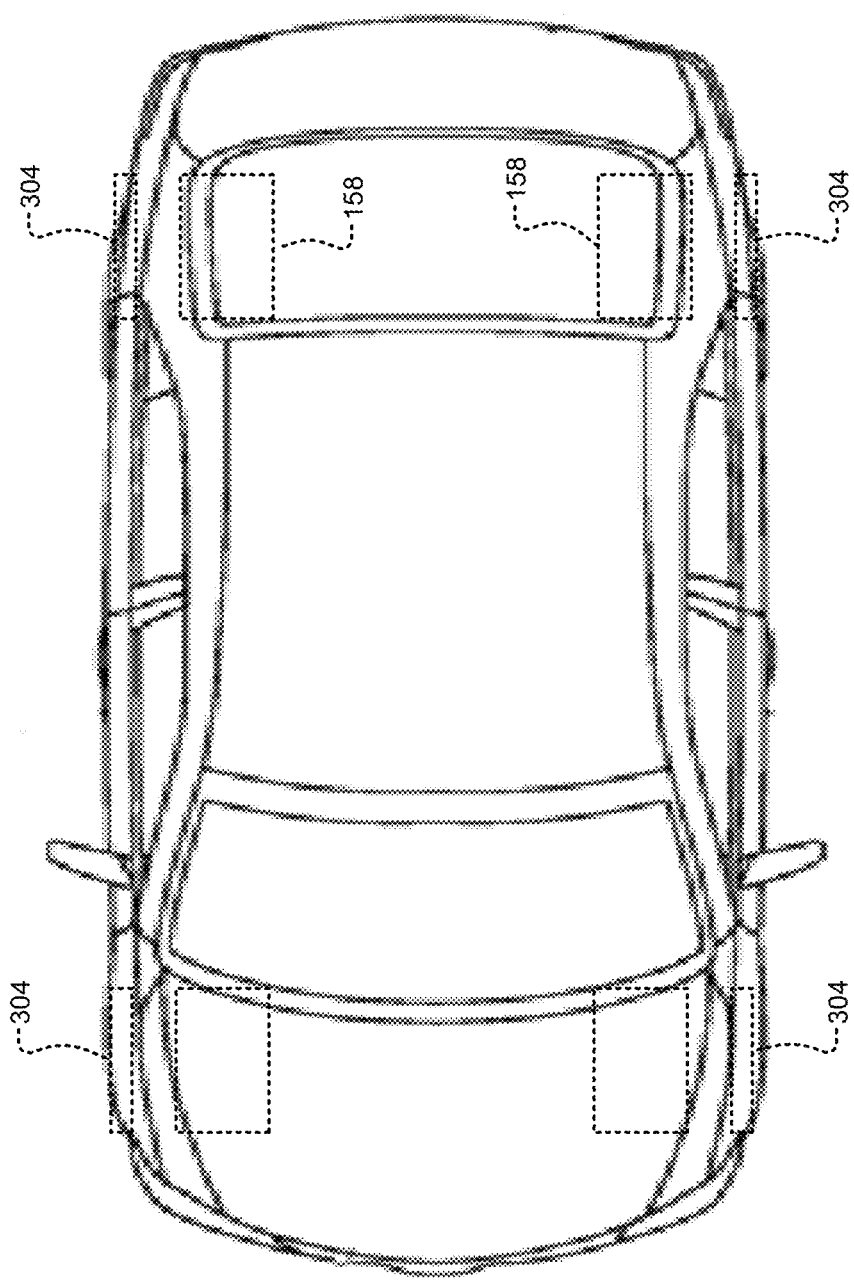
FIG. 3 is a functional block diagram of an example implementation of the vehicle.

FIG. 3 is a top view of the example vehicle of FIG. 2. FIG. 3 illustrates examples of wheels 304 and the dampers 158. The dampers 158 damp vertical motion of the wheels 304, respectively. As stated above, for example, the dampers 158 may include magnetorheological dampers, continuous damping control dampers, or another suitable type of adjustable damper.

Areas of oil may naturally be found after swells and dips in the road surface. For example, oil may be carried on vehicles, such as from leaks, spills, etc. Vertical motion of the vehicle from traversal of a swell or a dip may cause oil to be separated from the vehicle and to land on the road surface after the swell or dip. These deposits of oil may be found near the center of lanes. As discussed further below, the damper control module 156 detects areas of oil in the center of a lane in front of the vehicle and adjusts damping coefficients of the dampers 158 for the vehicle traversing the swells and/or dips.

Figure 4:
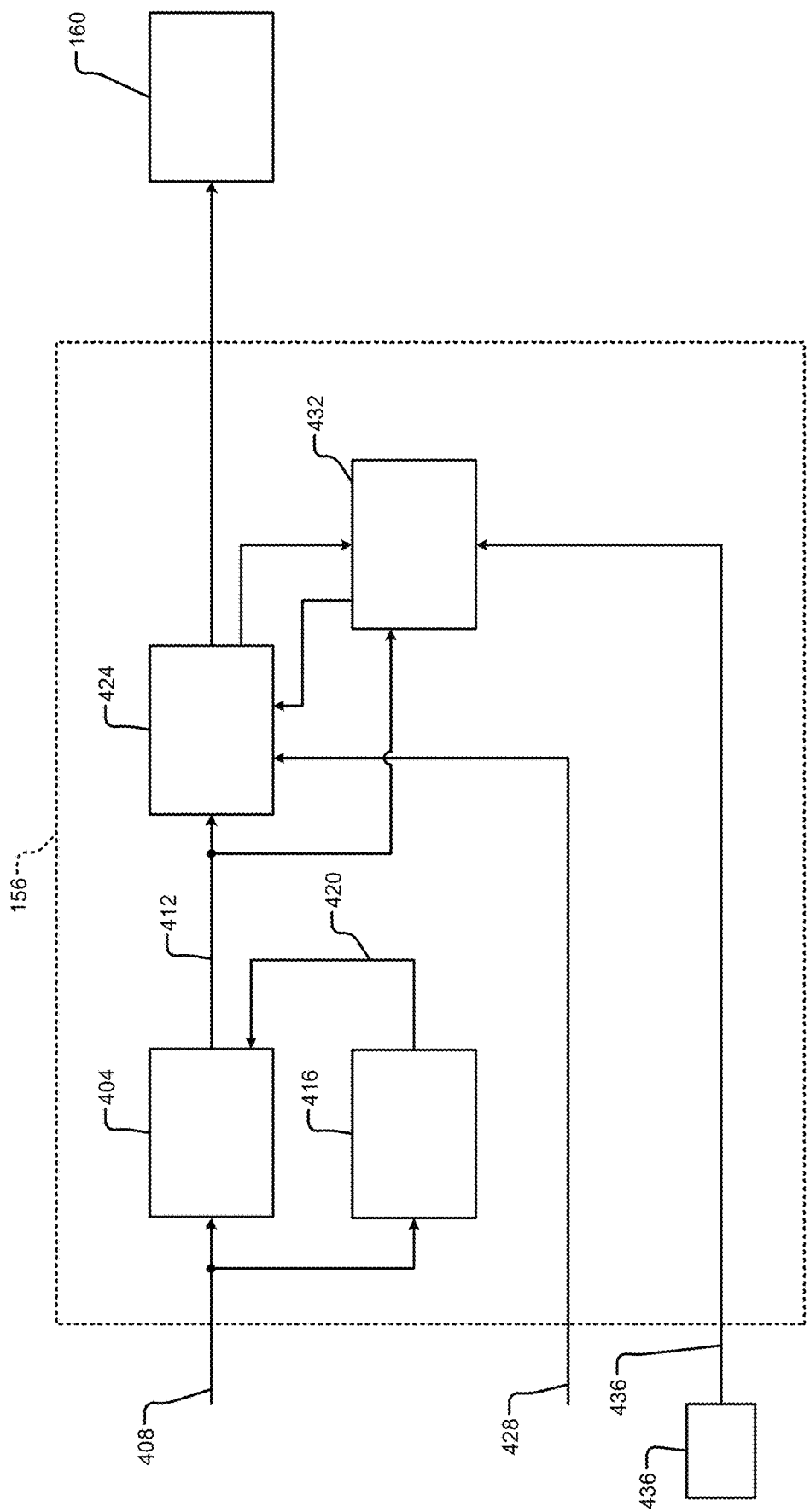
FIG. 4 is a functional block diagram of an example implementation of a damper control system.

FIG. 4 is a functional block diagram of an example implementation of the damper control module 156. An oil detection module 404 receives images 408 including a portion of the road in front of the vehicle from a forward-facing camera (e.g., the camera 204). The oil detection module 404 detects areas of oil on the road in front of the vehicle based on the images 408.

For example, the oil detection module 404 may determine an intensity value of each pixel of an image 408 based on a color (e.g., darkness) of that pixel. A black pixel may have an intensity value of 0, and a white pixel may have an intensity value of 255. While an example range of intensity values is provided, another suitable range may be used. The oil detection module 404 may detect an area of oil on the road, for example, when the image includes at least a predetermined number (e.g., 40) of neighboring pixels have intensity values that are less than a predetermined intensity value. The predetermined intensity value may be, for example, 50 in the example range above or another suitable value. 2 pixels may be considered neighboring when the 2 pixels share one edge. In various implementations the neighboring pixels may be required to have a predetermined shape, such as a rectangle or square shape having predetermined dimensions. The oil detection module 404 may indicate that no area of oil is detected when all of the pixels of the road have intensity values that are less than the predetermined value, which may occur, for example, in the instance of a blacktop road. The oil detection module 404 also indicates that no area of oil is detected when the image does not include at least the predetermined number of neighboring pixels have intensity values that are less than the predetermined intensity value.

The oil detection module 404 determines whether the area of oil is on the road in front of the vehicle and between lane boundaries of a present lane of the vehicle. For example, a lane module 416 may identify lane boundaries 420 of the present lane of the vehicle from the image using object detection. The oil detection module 404 may determine whether the area of oil is within the boundaries of the present lane of the vehicle based on determining whether the pixel locations of the area are within pixel locations of the boundaries of the present lane of the vehicle. The oil detection module 404 may indicate the presence of only areas of oil that are between the boundaries of the present lane of the vehicle. In various implementations, the oil detection module 404 may not indicate (via 412) the presence of areas identified that are outside of the boundaries of the present lane of the vehicle.

Figure 7:
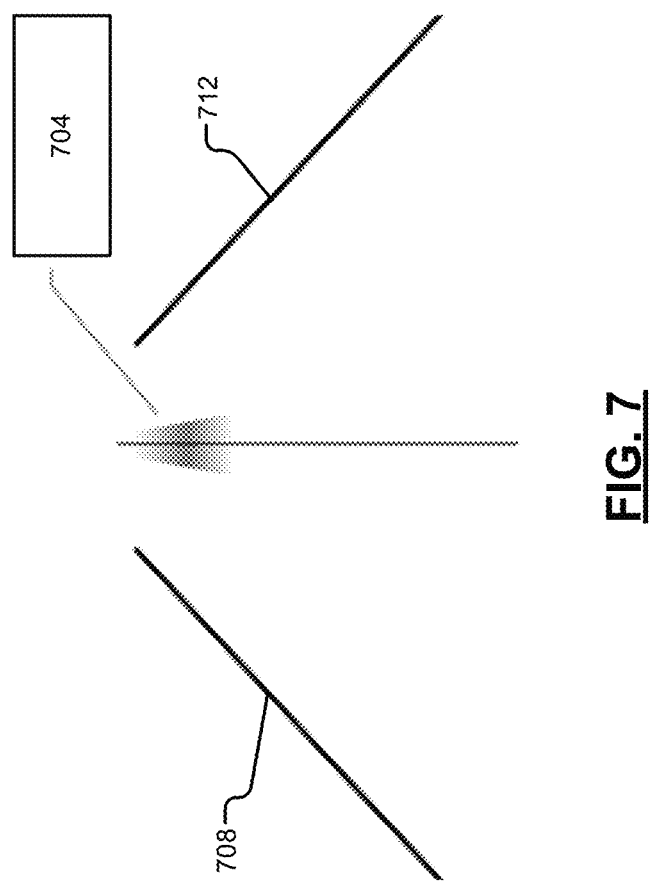
FIG. 7 includes an example illustration of an image including an area of oil between left and right boundaries of a present lane of a vehicle.

FIG. 7 includes an example illustration of an image including an area of oil 704 between left and right boundaries (e.g., lane lines) 708 and 712 of a present lane of a vehicle. In this example, the area of oil changes from lighter to darker.

When the oil detection module 404 detects an area of oil within the present lane of the vehicle, the oil detection module 404 also determines whether the area of oil transitions from (a) darker to lighter or (b) lighter to darker. Areas of oil may naturally transition from a darker color to a lighter color after locations where the road swells (rises) vertically upwardly. Areas of oil naturally transition from a lighter color to a darker color after locations where the road vertically dips downwardly. The oil detection module 404 may determine that the oil transitions from (a) darker to lighter, for example, when the pixels of the area have intensity values that increase moving away from the vehicle in front of the vehicle (vertically higher in the image). The oil detection module 404 may determine that the oil transitions from (b) lighter to darker, for example, when the pixels of the area have intensity values that decrease moving away from the vehicle in front of the vehicle.

The oil detection module 404 generates an oil area indicator 412 that indicates whether an area of oil has been detected within the present lane of the vehicle and, if so, whether the whether the area of oil transitions from (a) darker to lighter or (b) lighter to darker. For example, the oil detection module 404 may set the oil area indicator 412 to a first state when no areas of oil have been detected within the present lane of the vehicle. The oil detection module 404 may set the oil indicator 412 to a second state when an area of oil has been detected within the present lane that transitions (a) from darker to lighter. The oil detection module 404 may set the oil indicator 412 to a third state when an area of oil has been detected within the present lane that (b) transitions from lighter to darker.

The oil detection module 404 also determines a distance of a detected area of oil in front of the vehicle based on the locations of the pixels within the image. The oil detection module 404 may determine the distance to the area of oil in front of the vehicle, for example, using a lookup table that relates pixel locations of the neighboring pixels to distances. Generally speaking, the distance may be further as the area of the neighboring pixels is vertically higher in the image and vice versa.

A damping module 424 actuates the actuators 160 thereby controlling the damping coefficients of the dampers 158. The damping module 424 generally actuates the actuators 160 based on a (damping) mode 428. The damping mode 428 may be changed by a user via a mode input device, such as a button, switch, etc. or the infotainment module 183. Examples of modes include a sport mode, a normal mode, a comfort mode, etc. While example mode names and numbers of modes are provided, the present application is also applicable to modes named differently and other numbers of modes. The damping module 424 may determine a setting (e.g., power, hydraulic pressure, etc.) for the actuators based on the mode 428, for example, using a lookup table that relates damping modes to actuator settings. Each setting corresponds to different predetermined damping coefficients of the dampers 158. For example, the dampers 158 may have a first predetermined damping coefficient when the mode 428 is set to the sport mode, a second predetermined damping coefficient when the mode 428 is set to the normal mode, and a third predetermined damping coefficient when the mode 428 is set to the comfort mode. The first predetermined damping coefficient may be greater than the second predetermined damping coefficient, and the second predetermined damping coefficient may be greater than the third predetermined damping coefficient.

The damping module 424 adjusts the actuators 160 and adjusts the damping coefficients of the dampers 158 when an area of oil has been detected within the present lane of the vehicle. The damping module 424 adjusts the damping coefficients based on whether the area of oil within the present lane of the vehicle transitions from (a) darker to lighter or (b) lighter to darker. For example, when the area transitions from lighter to darker, there is a vertical dip in the present lane, so the damping module 424 adjusts the actuators 160 and decreases (e.g., relative to a present damping coefficient) the damping coefficients of the dampers 158 before the vertical dip (e.g., when the area of oil is detected). This allows the wheels to travel vertically downward into the vertical dip. When the vehicle has reached the vertical dip (e.g., the distance to the vertical dip is zero), the damping module 424 increases the damping coefficients (e.g., relative to a present damping coefficient) of the dampers 158. This minimizes vertical bouncing of the vehicle after the vertical dip. Later, the damping module 424 may return to control of the actuators 160 based on the mode 428. When the area transitions from darker to lighter, there is a vertical swell in the present lane, so the damping module 424 adjusts the actuators 160 and increases (e.g., relative to a present damping coefficient) the damping coefficients of the dampers 158 before the vertical swell (e.g., when the area of oil is detected). This allows the dampers 158 to absorb the force from the vertical swell and minimize vertical bouncing of the vehicle. Later, the damping module 424 may return to control of the actuators 160 based on the mode 428. The changes (increases or decreases) in the damping coefficient may be predetermined values.

In various implementations, a learning module 432 may be included and may adjust the changes for areas of oil. For example, the learning module 432 may monitor an acceleration (e.g., vertical acceleration) 436 of the vehicle during and after vertical swells and vertical dips and adjust one or more of the changes based on the acceleration. The acceleration 436 may be measured, for example, by an accelerometer of an inertial measurement module (IMM) 440 of the vehicle or obtained in another suitable manner. Adjustments to the changes may include increases and/or decreases. In various implementations, the learning module 432 may store the adjusted change in memory along with a location (e.g., global positioning system coordinates). The damping module 424 may control the actuators 160 based on the adjusted change at the location (for the vertical swell or dip) in the future.

Figure 5:
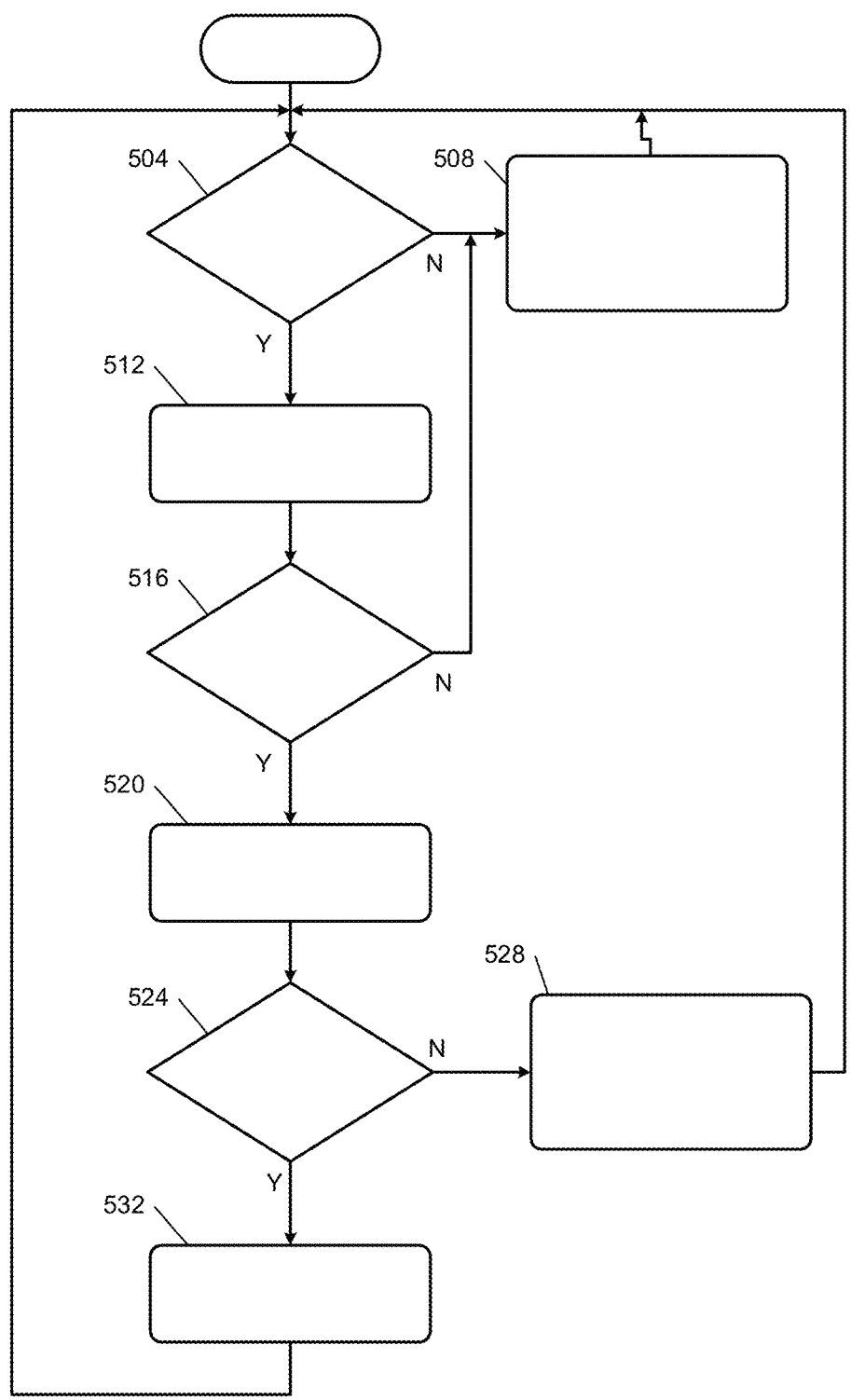
FIG. 5 is a flowchart depicting an example method of adjusting damping coefficients of the dampers based on detected areas of oil in the present lane of a vehicle.

FIG. 5 is a flowchart depicting an example method of adjusting damping coefficients of the dampers 158 based on detected areas of oil in the present lane of a vehicle. Control begins with 504 where the damping module 424 determines whether the forward facing camera (e.g., camera 204) is on. If 504 is false, the damping module 424 controls the dampers 158 based on the mode 428 at 508, and control returns to 504. If 504 is true, control continues with 512.

At 512, an image from the forward facing camera is received, and the lane module 416 detects the boundaries of the present lane of the vehicle in the image. At 516, the oil detection module 404 determines whether an area of oil is present between the boundaries of the present lane of the vehicle using the image as discussed above. If 516 is false, control transfers to 508 to control the dampers 158 based on the mode 428. If 516 is false, control may continue with 520.

At 520, the oil detection module 404 determines whether the area of oil transitions from light to dark or from dark to light in the image, as discussed above. The oil detection module 404 generates the indicator 412 to indicate whether the area transitions from light to dark or from dark to light.

At 524, the damping module 424 determines whether the area of oil transitions from dark to light. If 524 is false, at 528 the damping module 424 adjusts the actuators 160 to decrease the damping coefficients of the dampers 158 and later adjusts the actuators 160 to increase the damping coefficients of the dampers 158 for the vertical dip in the road. If 524 is true, at 532, the damping module 424 adjusts the actuators 160 to increase the damping coefficients of the dampers 158 for the vertical swell in the road. Control returns to 504 after the vehicle has traversed the vertical dip or swell.

Figure 6:
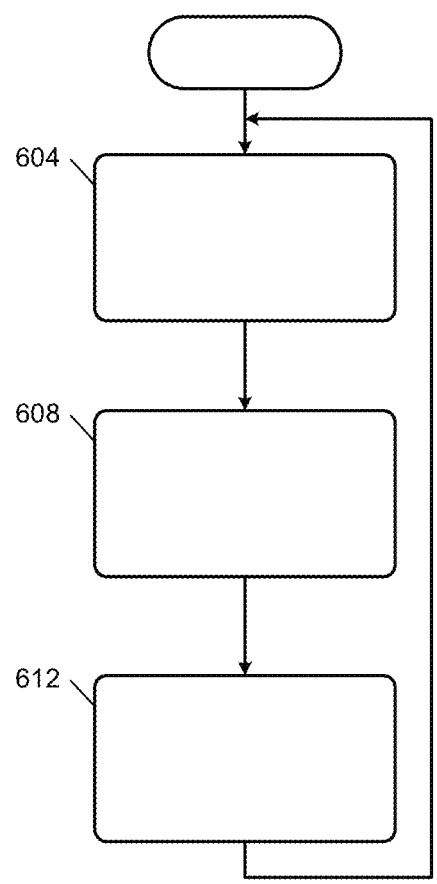
FIG. 6 is a flowchart depicting an example method of learning adjustments for damping coefficients based on measured vertical acceleration.

FIG. 6 is a flowchart depicting an example method of learning adjustments for damping coefficients based on measured vertical acceleration. Control begins with 604 where the damping module 424 adjusts the damping coefficients of the dampers 158 based on changes for a detected area of oil for a swell or dip in the present lane of the vehicle, as described above. At 608, the learning module 432 monitors the acceleration 436 measured by the accelerometer at and after the vehicle traverses the swell or dip. At 612, the learning module 432 selectively adjusts the changes based on the measured vertical acceleration, such as based on minimizing positive and negative vertical acceleration.

The learning module 432 may also receive the location of the swell or dip, such as from a GPS module. The learning module 432 may store the (adjusted or non-adjusted) changes in memory in association with the location of the swell or dip. The damping module 424 may control the actuators 160 based on the stored changes future instances when the vehicle will traverse the swell or dip.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A damper control system comprising:
    a lane module configured to identify boundaries of a present lane of a vehicle in an image of a road in front of the vehicle captured using a forward facing camera;
    an oil module configured to, from the image, determine whether an area of oil is present on the road between the boundaries of the present lane of the vehicle and determine whether the area of oil transitions from (a) darker to lighter or (b) lighter to darker; and
    a damping module configured to, when the area of oil is present on the road between the boundaries of the present lane of the vehicle, selectively adjust damping coefficients of adjustable dampers of the vehicle before the vehicle reaches the area of oil on the road,
    wherein the damping module is configured to adjust the damping coefficients based on whether the area of oil within the present lane of the vehicle transitions from (a) darker to lighter or (b) lighter to darker, wherein a determination that the area of oil transitions from (a) darker to lighter indicates that the road swells vertically upward, and a determination that the area of oil transitions from (b) lighter to darker indicates that the road dips vertically downward.

2. The damper control system of claim 1 wherein the damping module is configured to, when the transition of the area of oil on the road is from lighter to darker:
    for a first period, decrease the damping coefficients of the adjustable dampers; and
    for a second period that is after the first period, increase the damping coefficients of the adjustable dampers.

3. The damper control system of claim 1 wherein the damping module is configured to, when the transition of the area of oil on the road is from darker to lighter, increase the damping coefficients of the adjustable dampers.

4. The damper control system of claim 1 wherein the oil module is configured to determine whether the transition of the area of oil on the road is from darker to lighter or from lighter to darker based on intensity values of pixels of the area of oil in the image.

5. The damper control system of claim 4 wherein the oil module is configured to set the transition to darker to lighter when the intensity values of the pixels increase vertically upwardly in the image.

6. The damper control system of claim 4 wherein the oil module is configured to set the transition to lighter to darker when the intensity values of the pixels decrease vertically upwardly in the image.

7. The damper control system of claim 1 wherein the oil module is configured to determine whether the area of oil is present on the road between the boundaries of the present lane of the vehicle based on intensity values of pixels of the image between the boundaries of the present lane.

8. The damper control system of claim 1 wherein the oil module is configured to determine that the area of oil is present on the road between the boundaries of the present lane of the vehicle when a predetermined number of neighboring pixels between the boundaries of the present lane have intensity values, respectively, that are less than a predetermined intensity value,
wherein the predetermined number is greater than one.

9. The damper control system of claim 1 wherein the oil module is configured to determine that the area of oil is present on the road between the boundaries of the present lane of the vehicle when a predetermined number of neighboring pixels arranged in a predetermined shape between the boundaries of the present lane have intensity values, respectively, that are less than a predetermined intensity value,
wherein the predetermined number is greater than one and the shape is a rectangle.

10. The damper control system of claim 1 wherein the damping module is configured to adjust magnetic field output to the adjustable dampers of the vehicle before the vehicle reaches the area of oil on the road when the area of oil is present on the road between the boundaries of the present lane of the vehicle.

11. The damper control system of claim 1 wherein the adjustable dampers include magnetorheological dampers.

12. The damper control system of claim 1 wherein the adjustable dampers include continuous damping control (CDC) dampers.

13. The damper control system of claim 1 further comprising a learning module configured to selectively change the adjustments made by the damping module based on a vertical acceleration of the vehicle.

14. The damper control system of claim 13 wherein the learning module is configured to selectively change the adjustments made by the damping module based on the vertical acceleration of the vehicle at or after a vertical change in the road located before the area of oil on the road.

15. A damper control method comprising:
identifying boundaries of a present lane of a vehicle in an image of a road in front of the vehicle captured using a forward facing camera;
from the image, determining whether an area of oil is present on the road between the boundaries of the present lane of the vehicle and determining whether the area of oil transitions from (a) darker to lighter or (b) lighter to darker; and when the area of oil is present on the road between the boundaries of the present lane of the vehicle, selectively adjusting damping coefficients of adjustable dampers of the vehicle before the vehicle reaches the area of oil on the road including adjusting the damping coefficients based on whether the area of oil within the present lane of the vehicle transitions from (a) darker to lighter or (b) lighter to darker, wherein a determination that the area of oil transitions from (a) darker to lighter indicates that the road swells vertically upward, and a determination that the area of oil transitions from (b) lighter to darker indicates that the road dips vertically downward.

16. The damper control method of claim 15 further comprising, when the transition of the area of oil on the road is from lighter to darker:
for a first period, decreasing the damping coefficients of the adjustable dampers; and
for a second period that is after the first period, increasing the damping coefficients of the adjustable dampers.

17. The damper control method of claim 15 further comprising, when the transition of the area of oil on the road is from darker to lighter, increasing the damping coefficients of the adjustable dampers.

18. The damper control method of claim 15 further comprising determining the transition of the area of oil on the road based on intensity values of pixels of the area of oil in the image.

* * * * *